US009001006B2

(12) United States Patent
Yu et al.

(10) Patent No.: US 9,001,006 B2
(45) Date of Patent: Apr. 7, 2015

(54) OPTICAL-SEE-THROUGH HEAD MOUNTED DISPLAY SYSTEM AND INTERACTIVE OPERATION

(71) Applicant: Industrial Technology Research Institute, Hsinchu (TW)

(72) Inventors: Chih-Hsiang Yu, Hsinchu County (TW); Kuo-Tung Tiao, Hsinchu County (TW); Wei-Jia Huang, Nantou County (TW); Chia-Chen Chen, Hsinchu (TW); Tzuan-Ren Jeng, Hsinchu (TW); Hsien-Chang Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 176 days.

(21) Appl. No.: 13/862,470

(22) Filed: Apr. 15, 2013

(65) Prior Publication Data

US 2014/0139453 A1    May 22, 2014

(30) Foreign Application Priority Data

Nov. 21, 2012 (TW) .............................. 101143494 A

(51) Int. Cl.
*G09G 5/00* (2006.01)
*G02B 27/01* (2006.01)
*G06F 3/01* (2006.01)

(52) U.S. Cl.
CPC ............. *G02B 27/017* (2013.01); *G06F 3/011* (2013.01); *G02B 2027/0138* (2013.01); *G02B 2027/014* (2013.01)

(58) Field of Classification Search
USPC .............. 345/7–9, 419; 348/53; 359/630–633
See application file for complete search history.

(56) References Cited

U.S. PATENT DOCUMENTS 5,737,012 A * 4/1998 Tabata et al. .................... 348/53
6,341,869 B1 * 1/2002 Inami et al. ...................... 353/28
(Continued)

FOREIGN PATENT DOCUMENTS

| TW | I319495 | 1/2010 |
| TW | 201221999 | 6/2012 |
| TW | 201228380 | 7/2012 |

OTHER PUBLICATIONS

Ukita et al, "Wearable Virtual Tablet: Fingertip Drawing Interface using an Active-Infrared Camera," Proceedings of the IAPR Conference on Machine Vision Applications, Dec. 11-13, 2002, pp. 98-101.
Malik et al., "Visual Touchpad: A Two-handed Gestural Input Device," Proceedings of the 6th international conference on Multimodal Interfaces, Oct. 13-15, 2004, pp. 289-296.

(Continued)

*Primary Examiner* — Ricardo L Osorio
(74) *Attorney, Agent, or Firm* — Jianq Chyun IP Office

(57) ABSTRACT

An optical-see-through head mounted display (HMD) system is provided. The optical-see-through HMD system has a camera for generating image frames, a display device and a processor. The processor proceeds an interactive operation on each image frame. In the interactive operation, an image analysis is performed on the image frame to obtain positioning information of a marker and 3-dimensional information of an input device. According to the positioning information, the 3-dimensional information and eye position of an user, an image shielding process is performed to correct a portion of the frame to be displayed which is corresponding to the input device and a collision test is performed according to the positioning information and the 3-dimensional information of an input device to determine whether the input device touches the virtual image displayed by HMD. Then, an event corresponding to the touch position of the virtual image is executed.

24 Claims, 8 Drawing Sheets

(56) References Cited

U.S. PATENT DOCUMENTS

| | | |
|---|---|---|
| 7,215,322 B2 | 5/2007 | Genc et al. |
| 7,255,437 B2 | 8/2007 | Howell et al. |
| 7,787,992 B2 | 8/2010 | Pretlove et al. |
| 8,179,604 B1 | 5/2012 | Prada Gomez et al. |
| 2002/0105484 A1 | 8/2002 | Navab et al. |
| 2003/0030597 A1 | 2/2003 | Geist |
| 2005/0123171 A1* | 6/2005 | Kobayashi et al. ........... 382/103 |
| 2006/0061567 A1* | 3/2006 | Ouchi ........................ 345/419 |
| 2009/0300535 A1 | 12/2009 | Skourup et al. |
| 2010/0149073 A1 | 6/2010 | Chaum et al. |
| 2011/0213664 A1 | 9/2011 | Osterhout et al. |
| 2012/0113223 A1 | 5/2012 | Hilliges et al. |
| 2012/0120070 A1 | 5/2012 | Baillot |

OTHER PUBLICATIONS

Kato et al., "Marker Tracking and HMD Calibration for a Video-based Augmented Reality Conferencing System," Proc. of IWAR, Oct. 20-21, 1999, pp. 85-94.

Yang et al., "An Effective Robust Fingertip Detection Method for Finger Writing Character Recognition System," Proceedings of the Fourth International Conference on Machine Learning and Cybernetics (ICMLC), Aug. 18-21, 2005, pp. 4991-4996.

Liu et al., "A Robust Hand Tracking for Gesture-Based Interaction of Wearable Computers," Proceedings of the Eighth International Symposium on Wearable Computers 1, Oct. 31-Nov. 3, 2004, pp. 22-29.

"Office Action of Taiwan Counterpart Application", issued on Sep. 23, 2014, p. 1-6, in which the listed references were cited.

* cited by examiner

OPTICAL-SEE-THROUGH HEAD MOUNTED DISPLAY SYSTEM AND INTERACTIVE OPERATION

CROSS-REFERENCE TO RELATED APPLICATION

This application claims the priority benefit of Taiwan application serial no. 101143494, filed on Nov. 21, 2012. The entirety of the above-mentioned patent application is hereby incorporated by reference herein and made a part of this specification.

FIELD OF DISCLOSURE

The present disclosure relates to a head mounted display system and an operation method of the head mounted display system. More particularly, the present disclosure relates to an optical-see-through head mounted display system and an interaction operating method of the optical-see-through head mounted display system.

BACKGROUND

The wearable interaction device is one of the most prospective fields which the international companies are enthusiastically lay out the plan for after the development of the smart phone. The head mounted display (HMD) is one of the key devices in this field. The head mounted displays can be classified into immersion-type head mounted displays and see-through-type head mounted displays. By using the immersion-type head mounted display, the user cannot perceive the external environment and it is necessary to use an external camera to shoot the external images and to transmit the shot images to the display. By using the see-through-type head mounted display, the user can perceive both of the physical object in the external environment and the virtual images.

Although the augmented reality interaction system mainly based on the see-through-type head mounted display possesses relatively high sense of reality, the requirements for composing the real image and the virtual image is relatively high. The common issues of the see-through-type head mounted display comprises correction of the eye position, mutual interference between the real image and the virtual image and the erroneous shielding between the real image and the virtual image. Hence, the use of the see-through-type head mounted display in the augmented reality interaction system confronts a lot of difficult and complicated issues. Therefore, the see-through-type head mounted display is not as widely applicable as the immersion-type head mounted display.

SUMMARY OF THE DISCLOSURE

Accordingly, at least one objective of the present disclosure is to provide an optical-see-through head mounted display system and an interaction operating method capable of overcoming the issues of mutual interfering between the real image and the virtual image and the erroneous shielding between the real image and the virtual image and further capable of meeting the human operation patterns on operating the tablet personal computer so that the users can easily operates the tablet personal computer without having any learning or accommodation issue.

The disclosure provides an optical-see-through head mounted display system for being mounted on a user. The optical-see-through head mounted display system comprises a camera device, a display device and a processor. The camera device is used for continuously shooting a space to generate a plurality of image frames. The processor executes an interactive operation on each of the image frame. The interactive operation comprises performing an image analysis to obtain positioning information of a marker in the space and input device three-dimensional information of an input device in the space. According to the positioning information, an image size and an image position of an image to be displayed by the display device and a virtual image position of a virtual image of the image are determined. According to the input device three-dimensional information and an eye position of the user, an image shielding process is performed to calculate, in the image, a shielding area corresponding to the input device and an image process is performed on a portion of the image within the shielding area while the image is displayed. According to the positioning information and the input device three-dimensional information, whether the input device touches the virtual image is determined. When it is determined the input device touches the virtual image, according to a touch position which the input device touches the virtual image, an event represented by a specific position on the image corresponding to the touch position is executed.

The disclosure further provides an interaction operating method for an optical-see-through head mounted display system, wherein the optical-see-through head mounted display system has a camera device and a display device. The camera device continuously shoots a space to form a plurality of image frames. For each of the image frames, the interaction operation method comprises performing an image analysis to obtain positioning information of a marker in the space and input device three-dimensional information of an input device in the space. According to the positioning information, an image size and an image position of an image to be displayed by the display device and a virtual image position of a virtual image of the image are determined. According to the input device three-dimensional information and an eye position of the user, an image shielding process is performed to calculate, in the image, a shielding area corresponding to the input device and performing an image process on a portion of the image within the shielding area while the image is displayed. According to the positioning information and the input device three-dimensional information, it is determined whether the input device touches the virtual image. When it is determined the input device touches the virtual image, according to a touch position which the input device touches the virtual image, an event represented by a specific position on the image corresponding to the touch position is executed.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
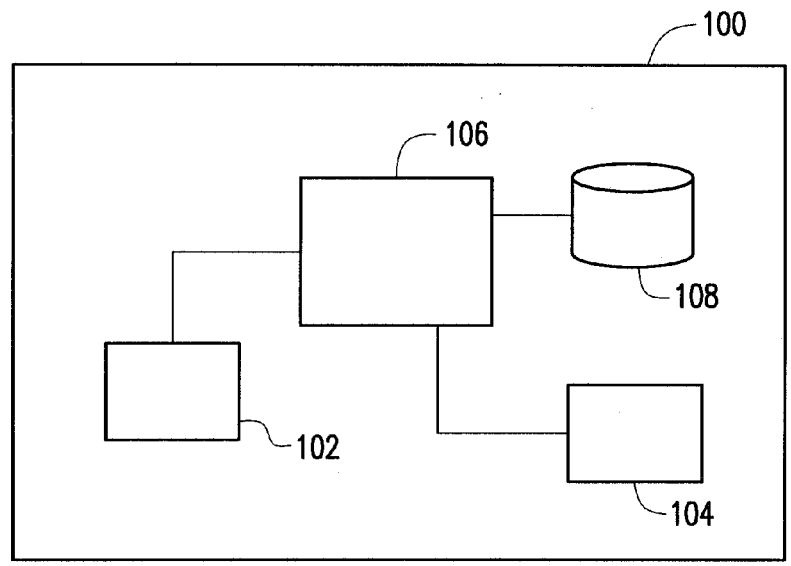
FIG. 1 is a schematic diagram showing an element structure of an optical-see-through head mounted display system according to one embodiment of the present disclosure.
Figure 2:
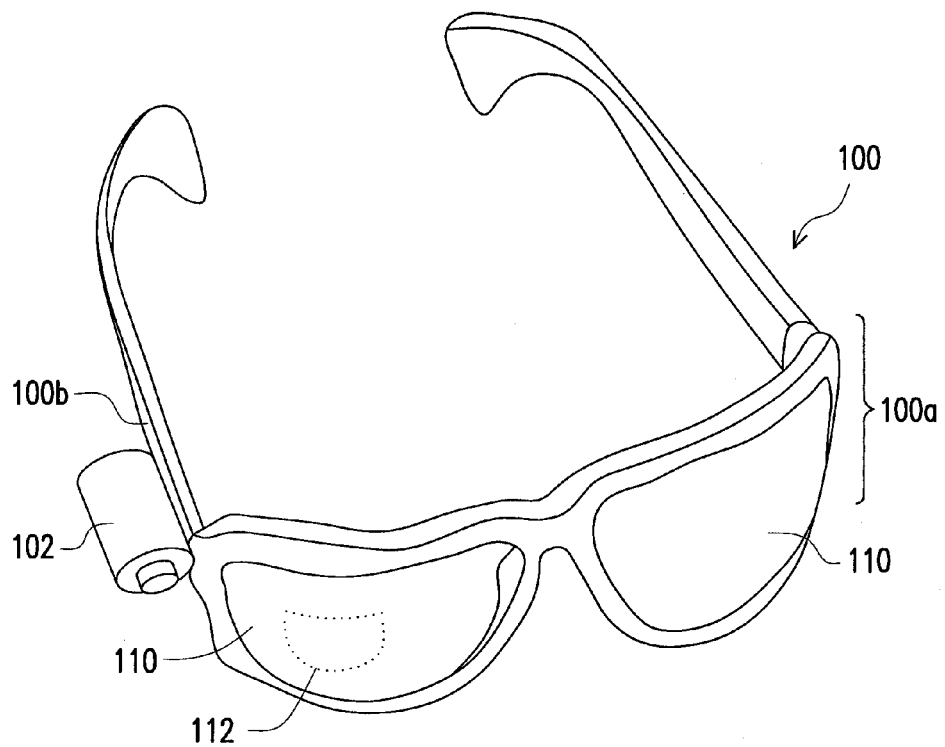
FIG. 2 is a schematic diagram showing a three-dimensional optical-see-through head mounted display system according to one embodiment of the present disclosure.
Figure 3:
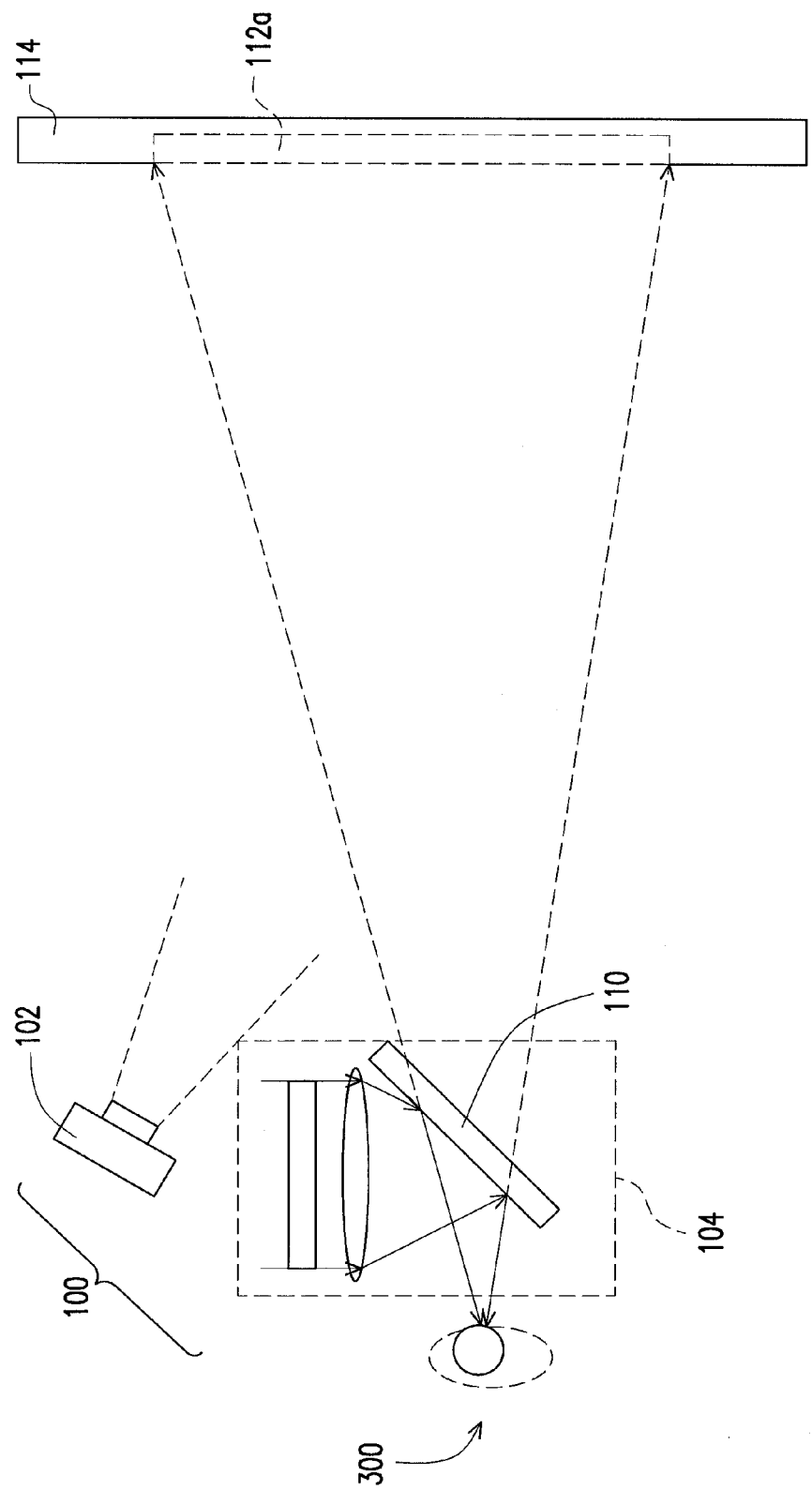
FIG. 3 is a schematic diagram showing an optical-see-through head mounted display system according to one embodiment of the present disclosure.

FIG. 1 is a schematic diagram showing an element structure of an optical-see-through head mounted display system according to one embodiment of the present disclosure. FIG. 2 is a schematic diagram showing a three-dimensional optical-see-through head mounted display system according to one embodiment of the present disclosure. FIG. 3 is a schematic diagram showing an optical-see-through head mounted display system according to one embodiment of the present disclosure. As shown in FIG. 1, FIG. 2 and FIG. 3, an optical-see-through head mounted display system 100 of the present embodiment is worn on a user (not shown) by an eyeglass-frame-type supporting holder 100a, for example. It should be noticed that the optical-see-through head mounted display system of the present disclosure is not limited to the eyeglass-frame-type supporting holder shown in FIG. 2. That is, the optical-see-through head mounted display system of the present disclosure can be worn on the user (user's head) by using any kind of supporting holder.

The optical-see-through head mounted display system 100 comprises a camera device 102, a display device 104, a processor 106 and a memory device 108. The camera device 102 can be, for example, a camera capable of simultaneously capturing colorful images and estimating depths of the shot object. More specifically, the camera device 102 can be, for example, a dual camera, a depth camera or a Bi-prism single camera. Moreover, the camera device 102 is used to continuously shoot a space to generate a plurality of image frames. Further, as shown in FIG. 2, the camera device 102 is configured on one leg 100b of the eyeglass-frame-type supporting holder 100a. Noticeably, the camera device 102 shown in FIG. 2 is configured on the left-hand-side leg 100b of the eyeglass-frame-type supporting holder 100a. However, the present disclosure is not limited thereto. The is, the portion of the eyeglass-frame-type supporting holder on which the camera device 102 is configured can be various according to the practical requirements.

As shown in FIG. 2 and FIG. 3, the display device 104 of the present embodiment is a projection display which projects the images to be perceived by the user 300 onto the see-through glass 110 on the supporting holder of the optical-see-through head mounted display system so as to generate a displayed image 112 on the glass 110. At the time the user perceives the image 112, the user can also perceives the scene behind the glass 110. The memory device 108 can be, for example, a memory, a memory card or a hard disk. The memory device 108 records marker features of a plurality of standard markers and the marker features comprise the shapes of markers and the contrasts of the markers. The processor 106 can be, for example, a micro-controller, an embedded controller or a central processing unit (CPU). The processor 106 sequentially performs an interaction operation on each of the image frames shot by the camera device 102. Furthermore, in another embodiment, the optical-see-through head mounted display system comprises a light source device for providing enough brightness while the environment is dark so that the stability of the image process of the optical-see-through head mounted display system can be maintained.

Figure 4:
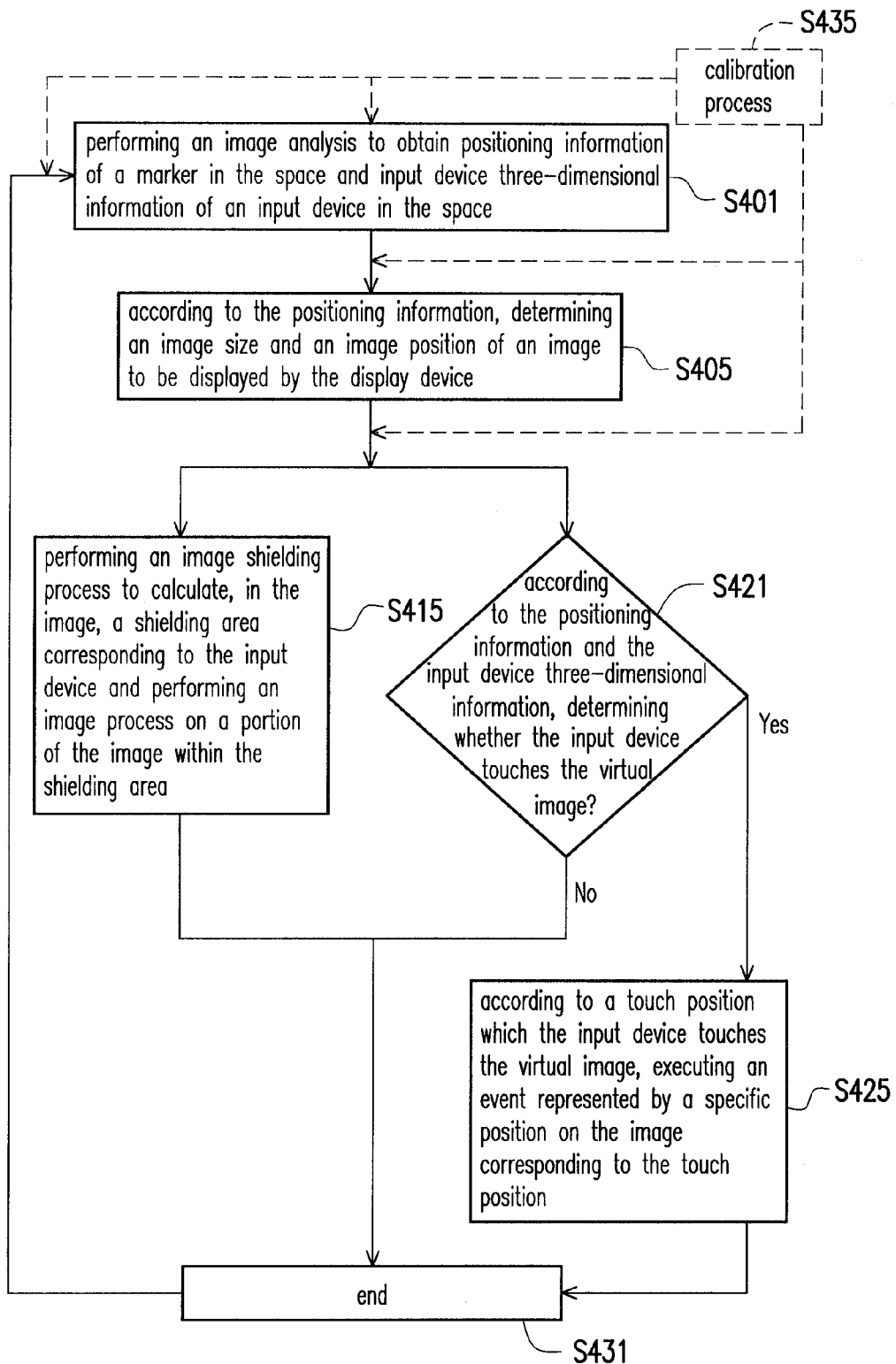
FIG. 4 is a flow chart illustrating an interaction operating method according to one embodiment of the present disclosure.

FIG. 4 is a flow chart illustrating an interaction operating method according to one embodiment of the present disclosure. As shown in FIG. 1, FIG. 3 and FIG. 4, the interaction operating method of the present embodiment is used for the optical-see-through head mounted display system 100 (as shown in FIGS. 1 through 3) of the present invention. As for each of the image frames, in the step S 401, the processor 106 performs an image analysis to obtain positioning information of a marker in the space which is shot by the camera device 102 and input device three-dimensional information of an input device in the space used by the user. In the optical-see-through head mounted display system of the present embodiment, the marker is used as a positioning marker and also can be used as the physical button. That is, in the later described calibration process, the marker is used as an alignment marker for correcting a relative position relationship between the three of the camera device 102, the eye position of the user and the display device 104. Moreover, based on the positioning information, the optical-see-through head mounted display system of the present embodiment defines a virtual image displaying region. In one embodiment, the aforementioned marker can be, for example, a substantial plane with fixed size and having several sub-markers disposed thereon. Furthermore, in another embodiment, the marker can be, for example, a marker set comprised of a plurality of sub-markers and the sub-markers are capable of being combined with each other or being detached from each other. Hence, the user can place the sub-markers in the space and the size of the virtual image display region defined by the sub-markers can be flexibly controlled.

The input device used by the user can be, for example, the user's finger, the stylus or any object with at least one protrudent end. Then, in the step S405, according to the positioning information of the marker in the space, the processor 106 determines an image size and an image position of an image (such as the displayed image 112 shown in FIG. 2) to be displayed by the display device 104. In the space shot by the camera device 102, the virtual image 112a of the image 112 is located at a space plane 114 defined by the marker. That is, by perceiving the image 112 displayed on the glass 110 of the supporting holder in the optical-see-through head mounted display system, the user has the delusion to make the user believe to perceive the virtual image 112a on the space plane 114. It should be noticed that the aforementioned space plane 114 defined by the marker is the plane positioned by the marker in the space. More specifically, according to the positioning information of the marker, a virtual image displaying region is delimited by the optical-see-through head mounted display system 100. In one embodiment, this space plane 114 can be, for example, any substantial plane (such as the wall, the tabletop or the floor) which the marker can be fixed on or a virtual plane which and the marker in the space are coplanar. In another embodiment, the contrast between the space plane and the marker is relatively large and by the processor 106 performing the image analysis, the positioning information of the marker is obtained to determine image size and the image position of the image 112 displayed by the display device 104 and then the processor 106 of the optical-see-through head mounted display system 100 delimits the virtual image displaying region.

More clearly, in the image analysis of the step S401, after at least one candidate marker in the space is selected based on the contrast, for example, the candidate marker is compared with the markers stored in the memory device 108 on marker features (such as the shapes of the marker or the contrasts of the markers) respectively to determine one of the candidate markers which is most similar to one of the standard markers stored in the memory device 108 and the determined candidate marker is regarded as the positioning marker. When the positioning marker is determined, the relative position between the positioning marker and the camera device 102, the position of the positioning marker, the size of the space plane 114 defined by the positioning marker, the position of the space plane 114 in the space and the image size and the image position of the image to be displayed by the display device 104 can be calculated (i.e. the image size and the image position of the image 112 to be perceived by the user 300 and projected onto the glass 110 of the supporting holder of the optical-see-through head mounted display system). The method for calculating the relative position between the positioning marker and the camera device 102 and the image size and the image position of the image to be displayed by the display device 104 comprises an augmented reality technology, for example.

Then, in the step S415, according to the input device three-dimensional information and an eye position of the user, an image shielding process is performed to calculate, in the image 112 to be displayed, a shielding area corresponding to the input device. Also, an image process is performed on a portion of the image 112 within the shielding area while the image 112 is displayed. The aforementioned image process comprises removing the portion of the image within the shielding area, setting the color of the portion of the image within the shielding area to be a specific color or making the portion of the image within the shielding area not overlap with the virtual image. Taking the example that the input device is the user's finger, the user perceiving the image 112 has delusion to make the user believe to perceive the virtual image 112a on the space plane 114. Hence, when no image shielding process is performed on the image 112 to be displayed and the hand is disposed between the user's eye and the space plane, the user perceives an overlapping image in which the virtual image is in front of the hand of the user. After the image shielding process is performed on the image 112 by the processor 106, the image process is performed on the shielding area, which is corresponding to the hand, in the image displayed by the display device. For instance, the shielding area corresponding to the hand is removed so that the caverned portion (i.e. the portion corresponding to the removed shielding area in the displayed image) in the virtual image which is perceived by the user through the optical-see-through head mounted display system is compactly matched with the physical hand so that there is no overlapping image in which the virtual image overlaps over the hand of the user.

At the time the step S415 is performed, in the step S421, according to the positioning information and the input device three-dimensional information obtained from the step S401, a collision test of the input device is performed to determine whether the input device touches the space plane 114. That is, it is determined whether the input device touches the virtual image. In other words, the positioning information of the marker can be used to determine the positioning information of the space plane 114 in the space (i.e. the positioning information of the virtual image in the user's delusion). Thus, according to the positioning information and the input device three-dimensional information of the input device, whether the input device touches the space plane 114/the virtual image 112a can be calculated. In the step S425, when it is determined the input device touches the space plane 114/the virtual image 112a, according to a touch position which the input device touches the virtual image 112a, an event represented by a specific position on the image corresponding to the touch position in the space. More specifically, in the step S421, when the input device three-dimensional information of the input device and the position information of the space plane 114/the virtual image 112a in the space reveal that the input device touches the space plane 114/the virtual image 112a or the distance between the input device and the space plane 114/the virtual image 112a is smaller than a predetermined value, it is determined that the input device touches the space plane 114/the virtual image 112a and the position information of the touch position which the input device touches the space plane 114/the virtual image 112a. Then, in the step S425, based on the position information of the touch position, the event corresponding to the specific position which is on the image to be displayed and is corresponding to the touch position on the virtual image can be determined and the event is executed by the processor 106.

Moreover, when, in the step S421, it is determined the input device does not touch the space plane 114/the virtual image 112a, the interaction operation of the single image frame is ended in the step S431.

In one embodiment, before the processor 106 executes the interaction operation (i.e. the interaction operation is at the non-activated status, the processor 106 detects whether there is any marker in the space to activate the interaction operating method of the present invention. For instance, when the interaction operation is not activated, the processor 106 only activate two-dimension detection of the camera device to save power. Once the marker or the specific hand gesture is detected, the interactive operation is activated immediately. In another embodiment, between the steps S401 through S431 of the interaction operation applied on the single image frame, when the processor 106 detects unexpected hand gesture or does not detect any marker for a while (such as 10 consecutive seconds), the interaction operation is ended immediately and the optical-see-through head mounted display system is resumed to the interaction operation non-activated status.

In the other embodiment, as the interaction operation is performed, the aforementioned optical-see-through head mounted display system further performs a calibration process (step S435). Clearly, every time the user wears the optical-see-through head mounted display system, the relative position between the user's eye and the display device is slightly different. Thus, it is necessary to perform a calibration process before the user starts to use the optical-see-through head mounted display system to insure that the image position of the image perceived by the user through the optical-see-through head mounted display system is as same as the image position of the image determined by the optical-see-through head mounted display system. That is, once the user wears the optical-see-through head mounted display system and initiate the interaction operation, the processor 106 performs the calibration process on the optical-see-through head mounted display system to correct the positions of the display device 104 and the camera device 102 and the eye position of the user so as to obtain a relative position relationship between the camera device, the eye position of the user and the display device. In other words, the result of the calibration process estimates the current eye position of the user every time the user wears the optical-see-through head mounted display system. Moreover, between the steps S401 through S431 of the interaction operation applied on single image frame, when finding out that the image perceived through the optical-see-through head mounted display system is misalignment to the real image (for instance, the marker in the virtual image corresponding to the image displayed by the display device does not correctly coincide with the actual marker), the user can show a specific hand gesture or press the marker which represents the calibration process. Therefore, the optical-see-through head mounted display system enters the calibration process immediately. For instance, in the calibration process, there is a virtual marker image in the virtual image 112a of the image 112 and the user manually align the actual marker with the virtual marker image so that the actual marker fully overlaps with the virtual marker image on the line of the user's vision. Further, through the calibration process executed by the processor 106, the eye position of the user corresponding to the camera device can be calculated.

Figure 5:
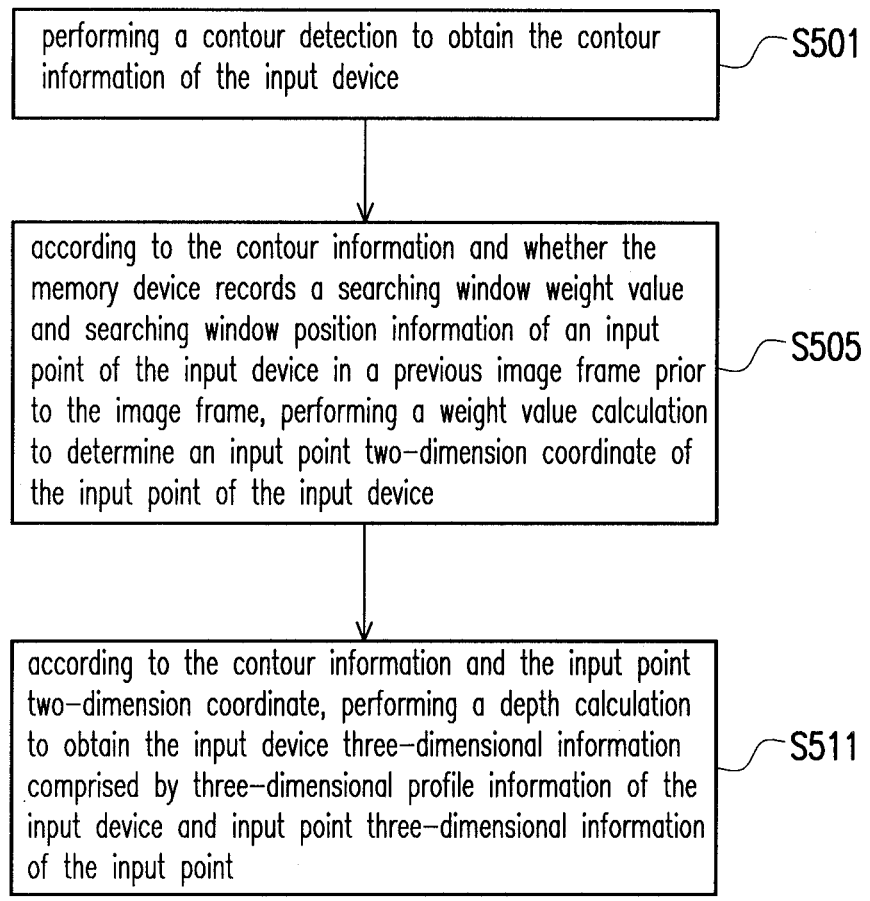
FIG. 5 is a flow chart illustrating an image analysis for obtaining input device three-dimensional information of the input device according to one embodiment of the present disclosure.

FIG. 5 is a flow chart illustrating an image analysis for obtaining input device three-dimensional information of the input device according to one embodiment of the present disclosure. In the embodiment shown in FIG. 5, the way (i.e. the step S401 in FIG. 4) the processor 106 performs the image analysis on each of the image frames to obtain the input device three-dimensional information of the input device is further detailed. As shown in FIG. 1 and FIG. 5, in the step S501, for each of the image frames captured by the camera device 102, the processor 106 performs a contour detection to obtain contour information of the input device. Then, in the step S505, according to the contour information and whether the memory device 108 records a searching window weight value and searching window position information of an input point of the input device in a previous image frame prior to the image frame currently in image analysis, a weight value calculation is performed to determine an input point two-dimension coordinate of the input point of the input device. The input point can be, for example, the fingertip or the penpoint of the stylus. In the step S511, according to the contour information and the input point two-dimension coordinate, a depth calculation is performed to obtain the input device three-dimensional information comprised by three-dimensional contour information of the input device and input point three-dimensional information of the input point.

In one embodiment, when the camera device 102 is a depth camera, the processor 106 performs the depth calculation (the step S511) to calculate the input device three-dimensional information comprised of the three-dimensional contour information of the input device and the input point three-dimensional information of the input point according to the depth information of the input device in the image frame provided by the depth camera. In another embodiment, when the camera device 102 is a dual camera, the contour information comprises left-image contour information and right-image contour information. Further, the input point two-dimension coordinate comprises a left-image input point two-dimension coordinate and a right-image input point two-dimension coordinate. Hence, in the depth calculation performed by the processor 106 (the step S511), for instance, a triangulation ranging process is performed to obtain the input device three-dimensional information comprised of the three-dimensional contour information of the input device and the input point three-dimensional information of the input point according to the left-image contour information, the right-image contour information, the left-image input point two-dimension coordinate and a right-image input point two-dimension coordinate.

Figure 6:
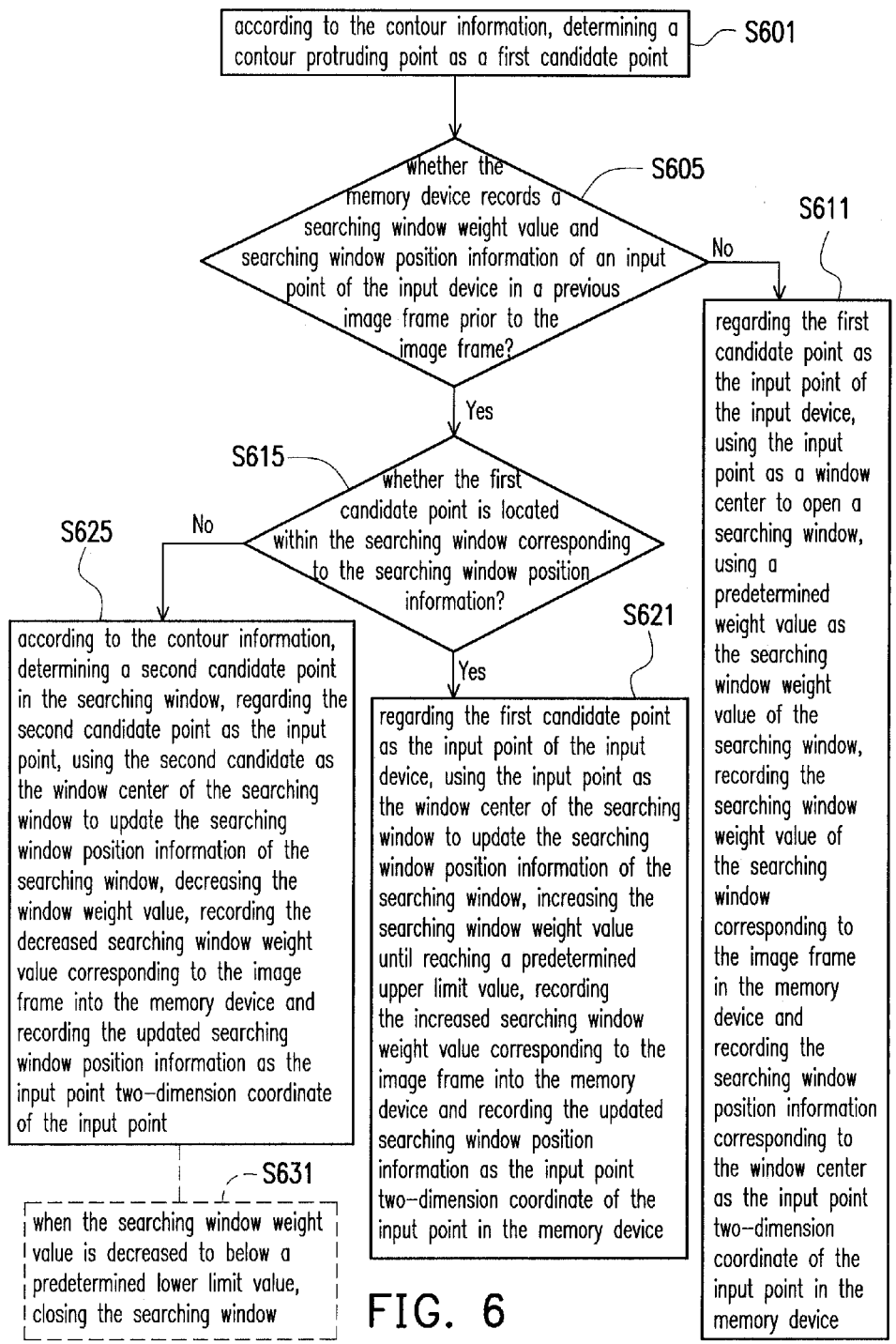
FIG. 6 is a flow chart illustrating a step of determining the two-dimension coordinate of the input point of the input device according to one embodiment of the present disclosure.
Figure 7:
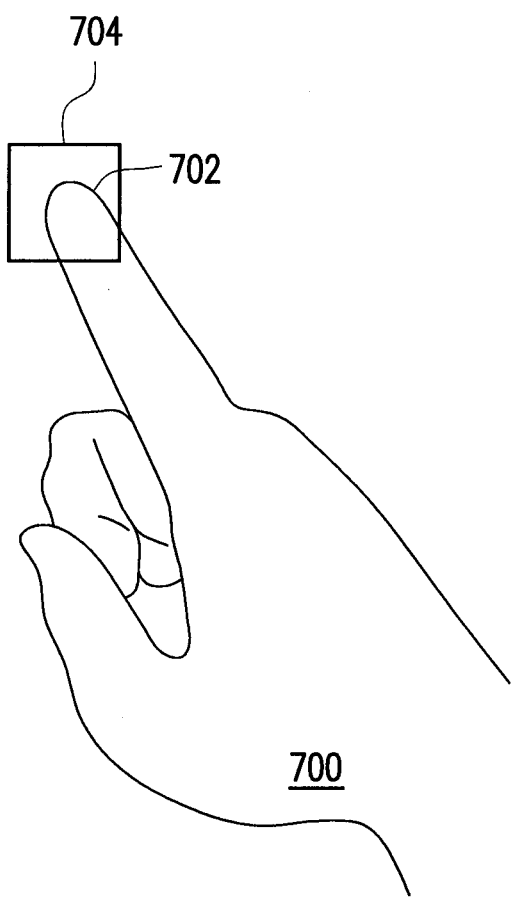
FIG. 7 is a schematic diagram showing an input device image in an image frame.

In the following paragraphs, the embodiments accompanied with the drawings are used to describe the aforementioned step (the step S505) of determining an input point two-dimension coordinate of the input point of the input device. FIG. 6 is a flow chart illustrating a step of determining the two-dimension coordinate of the input point of the input device according to one embodiment of the present disclosure. FIG. 7 is a schematic diagram showing an input device image in an image frame. As shown in FIG. 1 and FIG. 6, in the step S601, according to the contour information, the processor 106 determines a contour protruding point as a first candidate point. This contour protruding point can be, for example, the finger or the finger joint. Further, the method for determining one of the contour protruding points as the first candidate point comprises, for example, sequentially using each of the contour protruding points as a searching point. Then, in counterclockwise fashion and with the searching point as an initial point, a regional-contour-left-end point which is distance from the searching point with a predetermined shifting amount in form of the number of the contours is searched and, in clockwise fashion and with the searching point as an initial point, a regional-contour-right-end point which is distance from the searching point with a predetermined shifting amount in form of the number of the contours is searched. Thus, a regional contour center point is calculated by averaging the coordinates within a regional contour defined by the searching point, the regional-contour-left-end point and the regional-contour-right-end point. Further, the vector length between the searching point and the regional contour center point is calculated. By applying the algorithm mentioned above onto each of the searching point on the contour, the searching point corresponding to the maximum vector length is regarded as the contour protruding point and is also determined to be the first candidate point.

Thereafter, as shown in FIG. 6 and FIG. 7, in the step S605, the processor 106 determines whether the memory device 108 records the searching window weight value and the searching window position information of the input point of the input device in a previous image frame prior to the image frame currently in image analysis. In the step S611, when the memory device 108 does not record the searching window weight value and the searching window position information of the input point of the input device in the previous image frame prior to the image frame currently in image analysis, the first candidate point (i.e. the fingertip 702 shown in FIG. 7) is regarded as the input point of the input device (i.e. the hand 700 shown in FIG. 7), the input point is used as a window center to open a searching window (the searching window 704 shown in FIG. 7). Meanwhile, a predetermined weight value is used as the searching window weight value of the searching window 704, the searching window weight value of the searching window 704 corresponding to the image frame is recorded in the memory device 108 and the searching window position information corresponding to the window center (i.e. the input point/the fingertip 702) is recorded in the memory device 108 as the input point two-dimension coordinate of the input point.

Alternatively, when the memory device 108 records the searching window weight value and the searching window position information of the input point of the input device in the previous image frame prior to the image frame, it is further determined whether the first candidate point is located in the searching window corresponding to the searching window position information in the step S615. In the step S621, when the first candidate point is located in the searching window corresponding to the searching window position information, the processor 106 regards the first candidate point as a new input point of the input device, updates the searching window position information of the searching window (i.e. the searching window is moved so that the window center of the searching window is located on the first candidate point), increases the searching window weight value until it reaches a predetermined upper limit value, records the increased searching window weight value corresponding to the current image frame into the memory device 108 and records the updated searching window position information in the memory device 108 as the input point two-dimension coordinate of the input point.

Moreover, when the memory device 108 records the searching window weight value and the searching window position information of the input point of the input device in the previous image frame prior to the image frame and the first candidate point is not within the searching window corresponding to the searching window position information, the processor 106, according to the contour information, determines one contour protruding point within a portion of the contour of the input device enclosed by the searching window to be a second candidate point, regards the second candidate point as the new input point, uses the second candidate point as the window center of the searching window to update the searching window position information of the searching window (i.e. the searching window is moved so that the window center of the searching window is located on the second candidate point), decreases the searching window weight value, records the decreased searching window weight value corresponding to the image frame into the memory device 108 and records the updated searching window position information as the input point two-dimension coordinate of the input point (in the step S625). It should be noticed that when the aforementioned processor 106 decreases the searching window weight value until it is below a predetermined lower limit value, the searching window is closed (the step S631).

In the present embodiment, during the steps S601 through S625 of determining the two-dimension coordinate of the input point of the input device, in order to efficiently eliminate the noises which affect the optical-see-through head mounted display system while it determines the candidate point, the searching window position information and the searching window weight value corresponding to the searching window within the current image frame are both determined based on the searching window position information and the searching window weight value corresponding to the searching window on the input point within the previous image frame. That is, in the situation mentioned above, it ensures that each of the input points respectively in the consecutive image frames still remains within the searching window until the searching window disappears.

Figure 8:
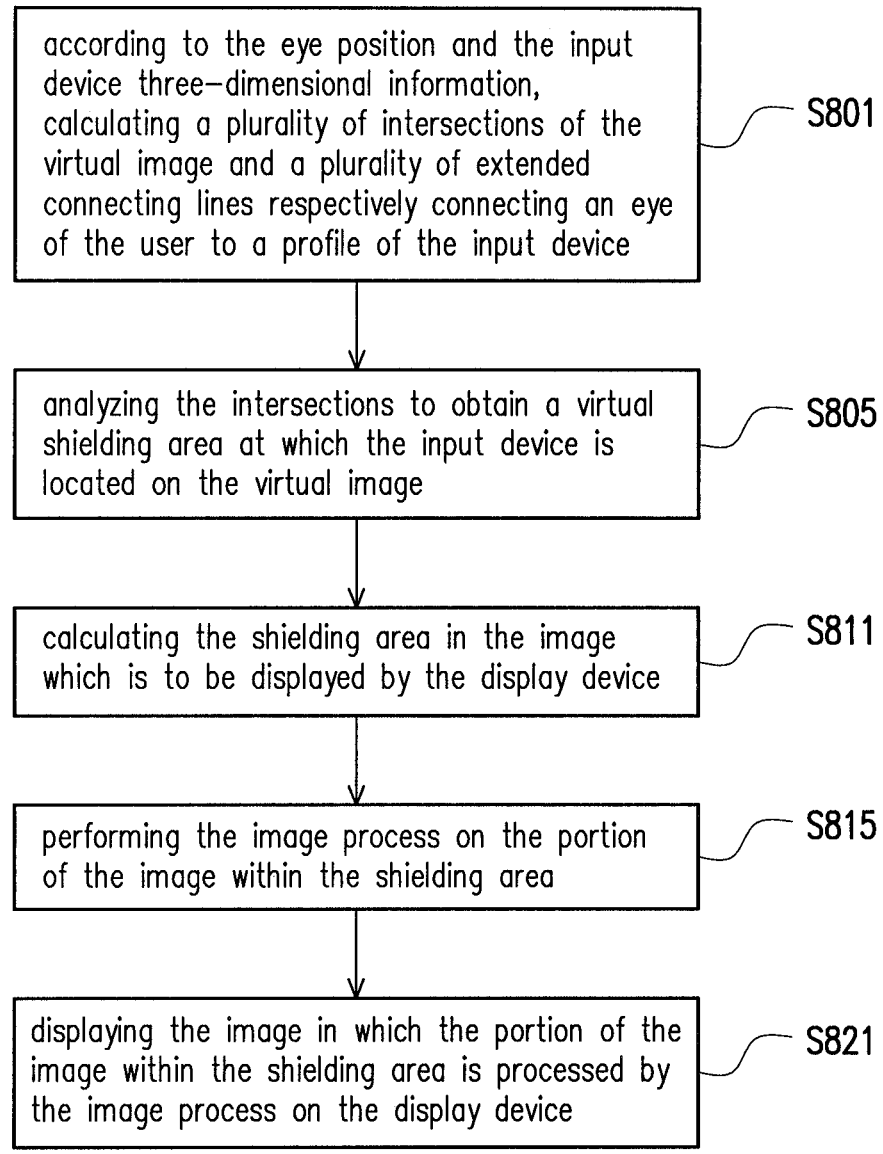
FIG. 8 is a flow chart illustrating an image shielding process according to one embodiment of the present disclosure.
Figure 9:
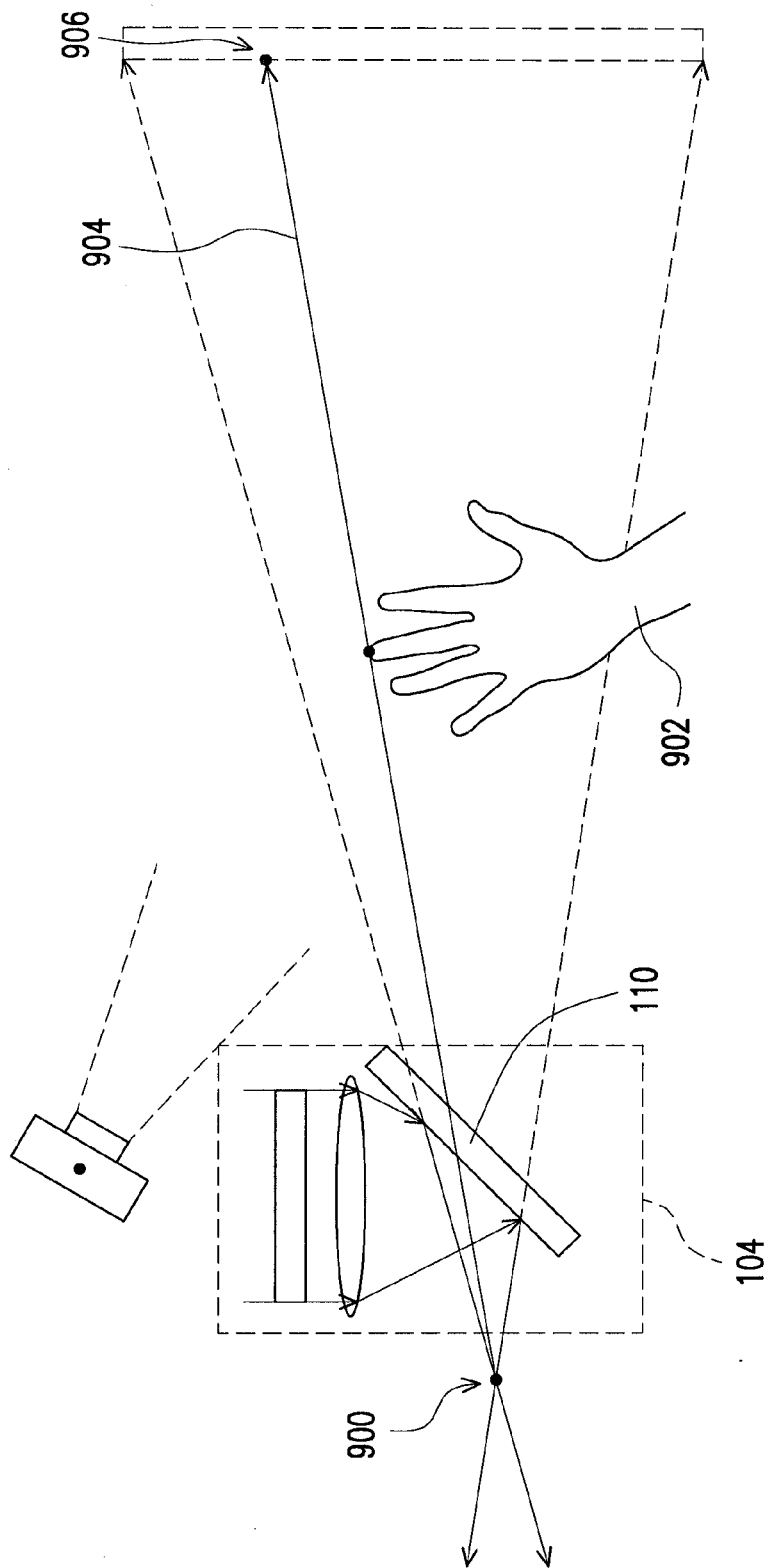
FIG. 9 is a schematic diagram showing an image shielding process according to one embodiment of the present disclosure.

In the following paragraphs, the embodiments accompanied with the diagrams are used to further describe the image shielding process (the step S415 shown in FIG. 4) in the interaction operation. FIG. 8 is a flow chart illustrating an image shielding process according to one embodiment of the present disclosure. FIG. 9 is a schematic diagram showing an image shielding process according to one embodiment of the present disclosure. As shown in FIG. 8 and FIG. 9, in the step S801, according to the eye position of the user (for instance, the eye position is obtained from the calibration process) and the input device three-dimensional information, a plurality of intersections 906 of the virtual image 112a on the space plane 114 and a plurality of extended connecting lines 904 respectively connecting an eye 900 of the user to a contour of the input device 902 are calculated. In the step S805, the intersections 906 are analyzed to obtain a virtual shielding area at which the input device 902 is located on the virtual image. In the step S811, according to the virtual shielding area, the shielding area in the image which is to be displayed by the display device is calculated, wherein the shielding area corresponds to the virtual shielding area (that is, the shielding area corresponds to the input device in the image to be displayed). In the step S815, the image process is performed on the portion of the image within the shielding area and, in the step S821, the image with the shielding area within which the portion of the image has been processed by the image process is displayed by the display device. Thus, the virtual image and the real image can be compactly matched with each other and the issues of the mutual interference between the real image and the virtual image and the erroneous shielding between the real image and the virtual image can be overcome.

Accordingly, in the present disclosure, the optical-see-through head mounted display system comprises the display device, the camera device capable of estimating the depth of the object to be shot and the processor. The virtual image of the image displayed by the display device is located on a plane in the space defined by the marker. Therefore, from the users' perceptions, the plane in the space defined by the marker is like a tablet personal computer. The camera device capable of estimating the depth of the object to be shot is used to detect three-dimensional position relationship between the plane in the space defined by the marker and the input point of the input device. Accordingly, whether the input point of the input device touches the plane in the space can be determined and the image shielding process is performed to achieve functions of the interaction operation. Hence, the optical-see-through head mounted display system and the interaction operating method of the present disclosure can decrease the mutual interference between the real image and the virtual image due to the interference of the environment and background and overcome the issue of the erroneous shielding between the real image and the virtual image. Thus the precision and stability of the interaction operation are increased. Moreover, the plane in the space defined by the marker is very similar to the tablet personal computer and provides the user the perception of touch so that the way to operate the system of the present disclosure meets the users' experiences. Hence, the users can easily operate the tablet personal computer without having any learning pain or accommodation issue.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. An interaction operating method for an optical-see-through head mounted display system, wherein the optical-see-through head mounted display system is mounted on a user and comprises a camera device and a display device and the camera device continuously shoots a space to form a plurality of image frames, for each of the image frame, the interaction operating method comprising:
performing an image analysis to obtain positioning information of a marker in the space and input device three-dimensional information of an input device in the space;
determining an image size and an image position of an image to be displayed by the display device and a virtual image position of a virtual image of the image according to the positioning information;

performing an image shielding process to calculate a shielding area in the image corresponding to the input device according to the input device three-dimensional information and an eye position of the user and performing an image process on a portion of the image within the shielding area while the image is displayed;

determining whether the input device touches the virtual image according to the positioning information and the input device three-dimensional information; and executing an event represented by a specific position on the image corresponding to the touch position according to a touch position which the input device touches the virtual image when it is determined the input device touches the virtual image.

2. The interaction operating method of claim 1, further comprising detecting the marker in the space to initiate the interaction operating method to be performed later on each of the image frames.

3. The interaction operating method of claim 1, further comprising performing a calibration process to obtain a relative position relationship between the camera device, the eye position of the user and the display device.

4. The interaction operating method of claim 1, wherein the image shielding process comprises:
calculating a plurality of intersections of the virtual image and a plurality of extended connecting lines respectively connecting an eye of the user to a contour of the input device according to the eye position and the input device three-dimensional information;
analyzing the intersections to obtain a virtual shielding area at which the input device is located on the virtual image;
calculating the shielding area in the image which is to be displayed by the display device according to the virtual shielding area, wherein the shielding area corresponds to the virtual shielding area;
performing the image process on the portion of the image within the shielding area; and
displaying the image in which the portion of the image within the shielding area is processed by the image process on the display device.

5. The interaction operating method of claim 1, wherein the optical-see-through head mounted display system further comprises a memory device, and the step of performing the image analysis on each of the image frames to obtain the input device three-dimensional information of the input device comprises:
performing a contour detection to obtain contour information of the input device;
performing a weight value calculation to determine an input point two-dimension coordinate of the input point of the input device according to the contour information and whether the memory device records a searching window weight value and searching window position information of an input point of the input device in a previous image frame prior to the image frame; and
performing a depth calculation to obtain the input device three-dimensional information comprised by three-dimensional contour information of the input device and input point three-dimensional information of the input point according to the contour information and the input point two-dimension coordinate.

6. The interaction operating method of claim 5, wherein the step of determining the input point two-dimension coordinate of the input point of the input device comprises:

determining a contour protruding point as a first candidate point according to the contour information; and regarding the first candidate point as the input point of the input device, using the input point as a window center to open a searching window, using a predetermined weight value as the searching window weight value of the searching window, recording the searching window weight value of the searching window corresponding to the image frame in the memory device and recording the searching window position information corresponding to the window center as the input point two-dimension coordinate of the input point in the memory device when the memory device does not record the searching window weight value and the searching window position information of the input point of the input device in the previous image frame prior to the image frame.

7. The interaction operating method of claim 6, further comprising:
regarding the first candidate point as the input point of the input device, using the input point as the window center of the searching window to update the searching window position information of the searching window, increasing the searching window weight value until reaching a predetermined upper limit value, recording the increased searching window weight value corresponding to the image frame into the memory device and recording the updated searching window position information as the input point two-dimension coordinate of the input point in the memory device when the memory device records the searching window weight value and the searching window position information of the input point of the input device in the previous image frame prior to the image frame and the first candidate point is located in the searching window corresponding to the searching window position information.

8. The interaction operating method of claim 6, further comprising:
determining a second candidate point in the searching window according to the contour information, regarding the second candidate point as the input point, using the second candidate as the window center of the searching window to update the searching window position information of the searching window, decreasing the searching window weight value, recording the decreased searching window weight value corresponding to the image frame into the memory device and recording the updated searching window position information as the input point two-dimension coordinate of the input point when the memory device records the searching window weight value and the searching window position information of the input point of the input device in the previous image frame prior to the image frame and the first candidate point is not within the searching window corresponding to the searching window position information.

9. The interaction operating method of claim 8, wherein the step of decreasing the searching window weight value further comprises:
closing the searching window when the searching window weight value is decreased to below a predetermined lower limit value.

10. The interaction operating method of claim 5, wherein when the camera device is a depth camera, the step of performing the depth calculation comprises:
calculating the input device three-dimensional information comprised of the three-dimensional contour information of the input device and the input point three-dimensional information of the input point according to depth information of the input device in the image frame provided by the depth camera.

11. The interaction operating method of claim 5, wherein when the camera device is a dual camera, the contour information comprises left-image contour information and right-image contour information, the input point two-dimension coordinate comprises a left-image input point two-dimension coordinate and a right-image input point two-dimension coordinate and the depth calculation comprises:
performing a triangulation ranging process to obtain the input device three-dimensional information comprised of the three-dimensional contour information of the input device and the input point three-dimensional information of the input point according to the left-image contour information, the right-image contour information, the left-image input point two-dimension coordinate and a right-image input point two-dimension coordinate.

12. The interaction operating method of claim 1, wherein the marker includes a marker set comprised of a plurality of sub-markers and the sub-markers are capable of being combined with each other or being detached from each other.

13. An optical-see-through head mounted display system for being mounted on a user, the optical-see-through head mounted display system comprising:
a camera device for continuously shooting a space to generate a plurality of image frames;
a display device;
a processor, executing an interactive operation on each of the image frames, wherein the interactive operation comprises:
performing an image analysis to obtain positioning information of a marker in the space and input device three-dimensional information of an input device in the space;
determining an image size and an image position of an image to be displayed by the display device and a virtual image position of a virtual image of the image according to the positioning information;
performing an image shielding process to calculate a shielding area in the image corresponding to the input device and performing an image process on a portion of the image within the shielding area while the image is displayed according to the input device three-dimensional information and an eye position of the user;
determining whether the input device touches the virtual image according to the positioning information and the input device three-dimensional information; and
executing an event represented by a specific position on the image corresponding to the touch position according to a touch position which the input device touches the virtual image when it is determined the input device touches the virtual image.

14. The optical-see-through head mounted display system of claim 13, wherein the processor further detects the marker in the space to initiate the interaction operation to be performed later on each of the image frames.

15. The optical-see-through head mounted display system of claim 13, wherein the processor performing the interaction operation further comprises performing a calibration process to obtain a relative position relationship between the camera device, the eye position of the user and the display device.

16. The optical-see-through head mounted display system of claim 13, wherein the processor performing the image shielding process further comprises:
calculating a plurality of intersections of the virtual image and a plurality of extended connecting lines respectively connecting an eye of the user to a contour of the input device according to the eye position and the input device three-dimensional information;
analyzing the intersections to obtain a virtual shielding area at which the input device is located on the virtual image;
calculating the shielding area in the image which is to be displayed by the display device, wherein the shielding area corresponds to the virtual shielding area according to the virtual shielding area;
performing the image process on the portion of the image within the shielding area; and
displaying the image in which the portion of the image within the shielding area is processed by the image process on the display device.

17. The optical-see-through head mounted display system of claim 13, further comprising a memory device, wherein the processor performing the image analysis on each of the image frames to obtain the input device three-dimensional information of the input device comprises:
performing a contour detection to obtain contour information of the input device;
performing a weight value calculation to determine an input point two-dimension coordinate of the input point of the input device according to the contour information and whether the memory device records a searching window weight value and searching window position information of an input point of the input device in a previous image frame prior to the image frame; and
performing a depth calculation to obtain the input device three-dimensional information comprised by three-dimensional contour information of the input device and input point three-dimensional information of the input point according to the contour information and the input point two-dimension coordinate.

18. The optical-see-through head mounted display system of claim 17, wherein the processor determining the input point two-dimension coordinate of the input point of the input device comprises:
determining a contour protruding point as a first candidate point according to the contour information; and
regarding the first candidate point as the input point of the input device, using the input point as a window center of a searching window to open the searching window, using a predetermined weight value as the searching window weight value of the searching window, recording the searching window weight value of the searching window corresponding to the image frame in the memory device and recording the searching window position information corresponding to the window center as the input point two-dimension coordinate of the input point in the memory device when the memory device does not record the searching window weight value and the searching window position information of the input point of the input device in the previous image frame prior to the image frame.

19. The optical-see-through head mounted display system of claim 18, wherein the processor determining the input point two-dimension coordinate of the input point of the input device further comprises:
regarding the first candidate point as the input point of the input device, using the input point as the window center of the searching window to update the searching window position information of the searching window, increasing the searching window weight value until reaching a predetermined upper limit value, recording the increased searching window weight value corresponding to the image frame into the memory device and recording the updated searching window position information as the input point two-dimension coordinate of the input point in the memory device when the memory device records the searching window weight value and the searching window position information of the input point of the input device in the previous image frame prior to the image frame and the first candidate point is located in the searching window corresponding to the searching window position information.

20. The optical-see-through head mounted display system of claim 18, wherein the processor determining the input point two-dimension coordinate of the input point of the input device further comprises:
regarding the second candidate point as the input point, using the second candidate as the window center of the searching window to update the searching window position information of the searching window, decreasing the searching window weight value, recording the decreased searching window weight value corresponding to the image frame into the memory device and recording the updated searching window position information as the input point two-dimension coordinate of the input point according to the contour information, determining a second candidate point when the memory device records the searching window weight value and the searching window position information of the input point of the input device in the previous image frame prior to the image frame and the first candidate point is not within the searching window corresponding to the searching window position information.

21. The optical-see-through head mounted display system of claim 20, wherein the processor decreasing the searching window weight value further comprises:
closing the searching window when the searching window weight value is decreased to below a predetermined lower limit value.

22. The optical-see-through head mounted display system of claim 17, wherein when the camera device is a depth camera, the processor performing the depth calculation comprises:
calculating the input device three-dimensional information comprised of the three-dimensional contour information of the input device and the input point three-dimensional information of the input point according to depth information of the input device in the image frame provided by the depth camera.

23. The optical-see-through head mounted display system of claim 17, wherein when the camera device is a dual camera, the contour information comprises left-image contour information and right-image contour information, the input point two-dimension coordinate comprises a left-image input point two-dimension coordinate and a right-image input point two-dimension coordinate and the processor performing the depth calculation comprises:
performing a triangulation ranging process to obtain the input device three-dimensional information comprised of the three-dimensional contour information of the input device and the input point three-dimensional information of the input point according to the left-image contour information, the right-image contour information, the left-image input point two-dimension coordinate and a right-image input point two-dimension coordinate.

24. The optical-see-through head mounted display system of claim 13, wherein the marker includes a marker set comprised of a plurality of sub-markers and the sub-markers are capable of being combined with each other or being detached from each other.

* * * * *